(12) United States Patent
Gao et al.

(10) Patent No.: US 11,230,677 B2
(45) Date of Patent: Jan. 25, 2022

(54) METHOD AND DEVICE FOR HEAVY OIL LIGHTENING AND SYNTHESIS GAS PRODUCTION

(71) Applicant: CHINA UNIVERSITY OF PETROLEUM-BEIJING, Beijing (CN)

(72) Inventors: Jinsen Gao, Beijing (CN); Yuming Zhang, Beijing (CN); Xingying Lan, Beijing (CN); Chengxiu Wang, Beijing (CN); Xiaogang Shi, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 0 days.

(21) Appl. No.: 17/028,957

(22) Filed: Sep. 22, 2020

(65) Prior Publication Data

US 2021/0087483 A1   Mar. 25, 2021

(30) Foreign Application Priority Data

Sep. 23, 2019   (CN) .......................... 201910901515.1

(51) Int. Cl.
*C10J 3/56* (2006.01)
*C10G 1/00* (2006.01)
(Continued)

(52) U.S. Cl.
CPC ................ *C10J 3/56* (2013.01); *B01D 3/143* (2013.01); *C10B 55/00* (2013.01); *C10G 1/002* (2013.01);
(Continued)

(58) Field of Classification Search
CPC ......... C10J 3/56; C10J 3/54; C10J 3/84; C10J 2300/1807; C10J 2300/0903;
(Continued)

(56) References Cited

U.S. PATENT DOCUMENTS

| 4,213,848 | A | * | 7/1980 | Saxton | .................... | C10B 49/10 |
| | | | | | | 208/127 |
| 4,511,459 | A | * | 4/1985 | Yan | .......................... | C10G 9/32 |
| | | | | | | 201/17 |

FOREIGN PATENT DOCUMENTS

| CN | 101451073 A | 6/2009 |
| CN | 101481626 A | 7/2009 |

(Continued)

*Primary Examiner* — Randy Boyer
*Assistant Examiner* — Juan C Valencia
(74) *Attorney, Agent, or Firm* — J.C. Patents

(57) ABSTRACT

A method for heavy oil lightening and synthesis gas production and a device thereof are provided, where the method uses a cracking/gasification coupled reactor, which internally has a cracking section and a gasification section that communicate with each other, and includes the following steps: feeding a heavy oil material into the cracking section to implement a cracking reaction, to produce a light oil gas and a coke; the coke being carried by the coke powders and descending into the gasification section to implement a gasification reaction, to produce a synthesis gas; at least performing a first stage gas-solid separation, collecting coke powder particles and dividing them into two parts; performing an oil and gas fractionation on a purified oil and gas product output by the gas-solid separation system, and collecting a light oil product and a synthesis gas product.

8 Claims, 2 Drawing Sheets

(51) Int. Cl.
  *C10G 1/04* (2006.01)
  *C10J 3/54* (2006.01)
  *C10B 55/00* (2006.01)
  *B01D 3/14* (2006.01)
  *C10J 3/84* (2006.01)

(52) U.S. Cl.
  CPC ............... *C10G 1/045* (2013.01); *C10J 3/54* (2013.01); *C10J 3/84* (2013.01); *C10J 2300/0903* (2013.01); *C10J 2300/1807* (2013.01)

(58) Field of Classification Search
  CPC ........ C10J 2300/0959; C10J 2300/0976; C10J 2300/0956; C10J 2300/0906; C10J 2300/0943; C10G 1/002; C10G 1/045; C10G 9/32; C10G 2300/1074; C10G 2300/1059; C10B 55/00; C10B 55/10; B01D 3/143
  See application file for complete search history.

(56) References Cited

FOREIGN PATENT DOCUMENTS

| | | |
|---|---|---|
| CN | 107099328 A | 8/2017 |
| CN | 108587674 A | 9/2018 |

\* cited by examiner

METHOD AND DEVICE FOR HEAVY OIL LIGHTENING AND SYNTHESIS GAS PRODUCTION

CROSS-REFERENCE TO RELATED APPLICATION

This application claims priority to Chinese Patent Application No. 201910901515.1, filed on Sep. 23, 2019, which is hereby incorporated by reference in its entirety.

TECHNICAL FIELD

The present disclosure relates to a method for heavy oil lightening and synthesis gas production and a device therefor, and in particular, to a method and a device for coupling treatment of lightening and gasification of a heavy oil material with each other, belongs to the field of petroleum processing technologies.

BACKGROUND

As the crude oil becomes heavy and inferior in quality, the output of an inferior heavy oil (viscous oil, super viscous oil, oil sand asphalt, vacuum residue, oil slurry, deoiled asphalt, etc.) has increased dramatically. The inferior heavy oil usually has the characteristics of low H/C ratio, high contents of sulfur, nitrogen and heavy metals and large carbon residue value, internally enriched residual carbons and asphaltene components result in a severe trend of coke formation during heavy oil processing. Due to problems such as catalyst deactivation, high hydrogen consumption and long-period operation, direct use of, for example, catalytic cracking or catalytic hydrogenation is difficult to meet the requirements of direct processing of a large number of inferior heavy oils. Compared with one-step heavy oil processing technology, use of a combination of techniques, for example, solvent deasphalting, visbreaking, catalytic cracking, hydrotreating and delayed coking to process the inferior heavy oil has a longer overall technological process and higher investment costs.

The delayed coking process, which is a currently widely used inferior heavy oil processing technology, has defects of furnace tube coking, high environmental pressure in decoking process, low liquid yield, etc. Additionally, the delayed coking process will produce a large number of solid cokes, especially high-sulfur coke, which is less valuable. The latest environmental protection requirements in China have taken measures to restrict the high-sulfur coke with sulfur content >3% from leaving factory. Some domestic refinery plants utilize petroleum coke produced by the delayed coking in a circulating fluidized bed combustion power generation or gasification poly-generation process, so as to realize the conversion and utilization of the coke. The heavy oil is firstly converted into the petroleum coke with low activity, then the petroleum coke is subjected to cooling, grinding, and reheating for conversion for the second time, but the overall technological process is complicated, with low efficiency.

Furthermore, since the inferior heavy oil material has a lower H/C atomic ratio, it is necessary to use the hydrogenation process to maximize the production of a light oil product, and to meet the quality requirements of a clean oil product; thus, in the process of processing the inferior heavy oil in refinery plants, the lack of hydrogen source is more prominent, the hydrogen produced by processes such as catalytic reforming is not enough to meet the hydrogen demand for clean oil production. Although direct gasification of the inferior heavy oil can convert the heavy oil directly into small molecules such as synthesis gas, the oil gas molecules and hydrogen contained in the heavy oil are not fully utilized, resulting in the waste of heavy oil resources to a certain extent.

Aiming at the above series of questions, many researchers have proposed the corresponding short-flow technical solutions for the processing and conversion of the inferior heavy oil. The flexible coking series of processes, which use fluidized coke powders as bed materials for heavy oil cracking reaction and which are developed by Exxon Company, is one of them.

The flexible coking process uses the coke powders as heat carriers for the heavy oil cracking reaction, the generated cokes, which adhere to the surface of the coke powders, need to be transported to a gasification/combustion reactor for removal, and thus, cokes materials in the reaction shall be recycled between, for example, the coking reactor, the combustion reactor and the gasification reactor, not only making it difficult to recycle the coke powders materials between multiple reactors, but also making it more difficult to achieve direct mass exchange or heat exchange between gasification of the cokes and coking reaction of the heavy oil, thereby increasing energy consumption of the cracking reaction.

SUMMARY

The present disclosure provides a method for heavy oil lightening and synthesis gas production, the method optimizes a circulation path of cokes generated in a cracking reaction of a heavy oil material, which not only increases the use value of the cokes and reduces the energy consumption of the cracking reaction, but also improves quality and yield of a light oil, meanwhile reducing the difficulty of process operation.

The present disclosure further provides a device for implementing the aforementioned method.

In order to achieve the above object, one aspect of the present disclosure provides a method for heavy oil lightening and synthesis gas production, using a cracking/gasification coupled reactor, which internally has a cracking section and a gasification section that communicate with each other, as a reactor, and the method includes the following steps:

feeding a heavy oil material into the cracking section at an upper part of the cracking/gasification coupled reactor, so as to contact with fluidized coke powders to implement a cracking reaction, to produce a light oil gas and a coke; the coke being carried by the coke powders and descending into the gasification section at a lower part of the cracking/gasification coupled reactor to implement a gasification reaction, to produce a synthesis gas; where the synthesis gas ascends into the cracking section, then is combined with the light oil gas, and is led out of the cracking/gasification coupled reactor to enter a gas-solid separation system;

at least performing a first stage gas-solid separation on the light oil gas and the synthesis gas in the gas-solid separation system, collecting coke powder particles and dividing them into two parts, which return to the cracking section and the gasification section respectively, to form a first stage circulation and a second stage circulation of the coke powder particles;

performing an oil and gas fractionation on a purified oil and gas product output by the gas-solid separation system, and collecting a light oil product and a synthesis gas product.

Further, the first stage gas-solid separation and a second stage gas-solid separation are sequentially performed on the light oil gas and the synthesis gas in the gas-solid separation system, so as to sequentially separate first stage coke powder particles and second stage coke powder particles, and collect a purified oil and gas product; the first stage coke powder particles are returned to the cracking section to form the first stage circulation of the coke powder particles, and the second stage coke powder particles are returned to the gasification section to form the second stage circulation of the coke powder particles; where a particle size of the first stage coke powder particles is greater than that of the second stage coke powder particles; or, the light oil gas and the synthesis gas is subjected to the first stage gas-solid separation in the gas-solid separation system, and collecting coke powder particles and passing them through a coke powder return distribution mechanism, then sending them back to the cracking section and the gasification section respectively by means of back blowing of a fluidizing gas, so as to form the first stage circulation and the second stage circulation of the coke powder particles.

Further, the particle size of the first stage coke powder particles is greater than 20 μm, the particle size of the second stage coke powder particles is less than 50 μm.

Further, a back blowing speed of the fluidizing gas is 0.2-3.0 m/s.

Further, conditions of the cracking reaction are: reaction temperature is 450-700° C., reaction pressure is 0.1-6.0 MPa, reaction time is 1-20 s, superficial gas velocity is 1-20 m/s, catalyst-oil ratio is 4-20.

Further, conditions of the gasification reaction are: reaction temperature is 850-1200° C., reaction pressure is 0.1-6.0 MPa, superficial gas velocity is 0.1-5.0 m/s, residence time of the coke powder particles is 1-20 min.

Further, before the coke is carried by the coke powders and descends into the gasification section at the lower part of the cracking/gasification coupled reactor to implement the gasification reaction, the method further includes: sequentially performing a steam stripping treatment and a particle size refining treatment on the coke powders.

Further, conditions of the steam stripping treatment are: a mass ratio of steam to the heavy oil material is 0.1-0.3, temperature of steam is 200-400° C., superficial gas velocity of the steam is 0.5-5.0 m/s.

Another aspect of the present disclosure provides a device for heavy oil lightening and synthesis gas production, for implementing any one of the above methods, the device including:

a cracking/gasification coupled reactor, internally including: a cracking section and a gasification section that communicate with each other, as well as a raw material inlet, an oil gas outlet, a first stage particle inlet and a second stage particle inlet, where the cracking section is located above the gasification section, the first stage particle inlet and the raw material inlet are located on the cracking section, the second stage particle inlet is located on the gasification section, the oil gas outlet is located at a top of the cracking/gasification coupled reactor;

a gas-solid separation system, including a gas-solid separation inlet, a gas-solid separation oil gas outlet and a gas-solid separation solid outlet; and a fractionating tower, including a fractionating tower inlet and a plurality of light component outlets;

where the gas-solid separation system is located outside the cracking/gasification coupled reactor, the oil gas outlet communicates with the gas-solid separation inlet, the first stage particle inlet and the second stage particle inlet respectively communicate with the gas-solid separation solid outlet, and the gas-solid separation oil gas outlet communicates with the fractionating tower inlet.

Further, the gas-solid separation system includes a first gas-solid separation device and a second gas-solid separation device;

where an inlet of the first gas-solid separation device communicates with the oil gas outlet, a solid outlet of the first gas-solid separation device communicates with the first stage particle inlet, an oil gas outlet of the first gas-solid separation device communicates with an inlet of the second gas-solid separation device, a solid outlet of the second gas-solid separation device communicates with the second stage particle inlet, an oil gas outlet of the second gas-solid separation device communicates with the fractionating tower inlet.

The implementation of the present disclosure has at least the following advantages:

1. The present disclosure fully exerts a synergistic effect between two reactions, i.e., cracking of the heavy oil and gasification of the coke. On one hand, the coke powder particles generated in the cracking section are used as a reaction material in the gasification section, so as to react in the gasification section to produce a high-quality synthesis gas, avoiding the generation of petroleum coke, enriching a source of hydrogen in refinery plants; on the other hand, after the gasification, the synthesis gas ascends into the cracking section, and on one hand, it can provide heat for the cracking reaction, and at the same time, it can be used as a reaction atmosphere for the cracking of the heavy oil, and especially under pressure, it can improve the yield and quality of the light oil through providing active components such as hydrogen radicals; therefore, the method according to the present disclosure achieves technical advantages of, for example, mutual supply of materials, mutual complementation of energy, synergistic reaction and co-production of oil and gas between two reactions through the aforementioned process;

2. The present disclosure provides an integrated process of heavy oil cracking-coke gasification and a coupled reactor device thereof, which, by coupling an upper heavy oil cracking section and a lower coke gasification section in the same reaction system, avoid problems of difficult circulation operation between multiple reactors, complicated process, large occupied area and high investment in processes such as flexible coking process, further improve energy efficiency and increase technological economy of the method.

DESCRIPTION OF EMBODIMENTS

Figure 1:
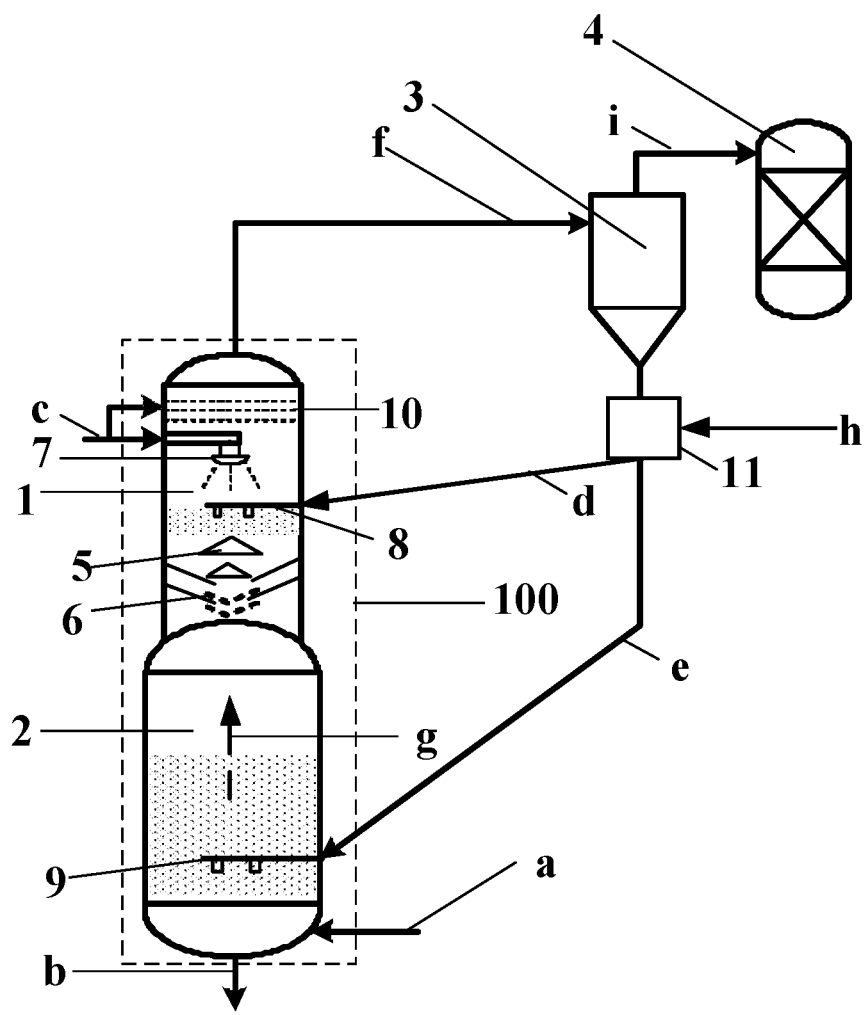
FIG. 1 is a schematic diagram of a device of heavy oil lightening and synthesis gas production provided by an embodiment of the present disclosure.

In order to make the objects, technical solutions and advantages of the present disclosure more explicit, the technical solutions in the examples of the present disclosure will be described explicitly and completely in conjunction with examples of the present disclosure. Obviously, the described examples are only part of the examples of the present disclosure, but not all the examples. Based on the examples in the present disclosure, all other examples obtained by the skilled in the art without any creative work fall within the protection scope of the present disclosure.

The present disclosure provides a method for heavy oil lightening and synthesis gas production, using a cracking/gasification coupled reactor, which internally has a cracking section and a gasification section that communicate with each other, as a reactor, where the method includes following steps:

feeding a heavy oil material into the cracking section at an upper part of the cracking/gasification coupled reactor, so as to contact with fluidized coke powders for implementing a cracking reaction, to produce a light oil gas and a coke; the coke being carried by coke powders and descending into the gasification section at a lower part of the cracking/gasification coupled reactor for implementing a gasification reaction, to produce a synthesis gas; where the synthesis gas ascends into the cracking section, then is combined with the light oil gas, is led out of the cracking/gasification coupled reactor and enters a gas-solid separation system;

at least performing a first stage gas-solid separation on the light oil gas and the synthesis gas in the gas-solid separation system, collecting coke powder particles and dividing them into two parts, which return to the cracking section and the gasification section respectively, so as to form a first stage circulation and a second stage circulation of the coke powder particles;

performing an oil and gas fractionation on a purified oil and gas product output by the gas-solid separation system, and collecting a light oil product and a synthesis gas product.

The cracking/gasification coupled reactor according to the present disclosure refers to an integrated coupled reactor capable of implementation of a cracking reaction and a gasification reaction at the same time, and the cracking section is located above the gasification section.

In the aforementioned method, a heavy oil material enters into the cracking section through a raw material inlet of the cracking/gasification coupled reactor, and contacts with fluidized coke powders within the cracking section for implementing a cracking reaction, so as to produce a light oil gas and a coke; where coke adheres to a surface of coke powder particles and become the coke powder particles. In order to increase a contact area between the heavy oil material and the fluidized coke powders, an atomization device can be configured at the raw material inlet, to atomize the heavy oil material and then contact with the fluidized coke powders for implementing the cracking reaction.

In the cracking section, due to excessively large particle size, some coke powder particles (the coke being carried by the coke powders) descend into the gasification section under the action of gravity, and undergo a gasification reaction with a gasification agent in the gasification section, thereby producing a synthesis gas containing small active molecules such as hydrogen and carbon monoxide.

With the continuous production of the synthesis gas, the synthesis gas will ascend into the cracking section, and on one hand, the synthesis gas will provide heat required for the cracking reaction, so that the heat in two reaction zones, i.e., cracking and gasification zones, can be matched and utilized, to improve overall energy efficiency; on the other hand, hydrogen in the synthesis gas can inhibit the coking reaction in the cracking reaction of the heavy oil to a certain extent, to improve the distribution of products in the cracking of the heavy oil, thereby improving the quality and yield of the oil gas.

Besides that the coke powder particles in the above cracking section will descend into the gasification section, the light oil gas produced by the cracking reaction in the cracking section will combine with the synthesis gas ascended from the gasification section. When the light oil gas and the synthesis gas are led out of the coupled reactor, some coke powder particles in the cracking section will also be carried. Therefore, in order to avoid the waste of these coke powder particles, the light oil gas and the synthesis gas can be first introduced into a gas-solid separation system for a gas-solid separation. After the gas-solid separation, the purified oil and gas product is output from the gas-solid separation system, and then is subjected to further fractionation, obtaining a light oil product and a synthesis gas product.

The coke powder particles obtained by the gas-solid separation can be divided into two parts for application, one part of the coke powder particles return to the cracking section to continue to be as carriers for the cracking reaction; the other part enter into the gasification section and undergo a gasification reaction with the gasification agent; where the return of the coke powder particles to the cracking section is referred to as a first stage circulation of the coke powder particles, and the entry of the coke powder particles into the gasification section is referred to as a second stage circulation of the coke powder particles.

The present disclosure utilizes an upper cracking-lower gasification coupled reactor to perform a cracking treatment on the heavy oil raw material, which provides a more convenient path for recycling of the coke powder particles, and enables the coke powder particles in the cracking section to directly descend into the gasification section under the action of gravity, to participate in the gasification reaction, so that the process flow is simplified, and the heat loss of the coke powder particles due to a complex path is avoided. At the same time, the synthesis gas carrying heat can ascend into the cracking section directly, which not only provides the reaction heat for the cracking reaction, but also provides a hydrogen atmosphere for the cracking reaction, inhibiting the coke formation in the cracking reaction, and being beneficial to the improvement of the quality and yield of the oil gas.

Furthermore, the present disclosure also increases the utilization rate of the coke powder particles by performing a first stage circulation and a second stage circulation on the coke powder particles obtained by the gas-solid separation, thereby further improving the yield of the light oil and the synthesis gas, and increasing efficiency of heavy oil lightening and synthesis gas production.

The present disclosure can form mutual supply of materials and mutual complementation of heat between two reactions, i.e., cracking and gasification, in one reactor, achieving technical advantages of, for example, coupling and synergistic reaction and co-production of oil and gas. The entire coupled reactor can be operated under high pressure, thereby greatly improving the processing capability, and achieving quality enhancement by high-quality synthesis gas on the cracking process of the heavy oil under high pressure.

Further, before the cokes are carried by the coke powders and descend into the gasification section at the lower part of the coupled reactor to implement the gasification reaction, the method further includes sequentially performing a steam stripping treatment and a particle size refining treatment on the coke powders.

Specifically, a steam stripping section and a particle size refining section can also be provided between the cracking section and the gasification section of the coupled reactor, to sequentially perform the steam stripping treatment and particle size refining treatment on the coke powder particles descended from the cracking section. Where the steam stripping treatment can remove the oil gas on the surface of the descended coke powder particles, the particle size refining treatment can cut and refine the particle size of the coke powder particles after the steam stripping treatment, so as to avoid reduced yield of the synthesis gas caused by bonding and agglomeration of the coke powder particles.

In a specific embodiment, the steam stripping section may include a multi-layer stripping structure, so as to remove the light oil gas on the surface of the coke powder particles by the effect of the stripping steam that is entered through a stripping steam inlet. Specifically, the multi-layer stripping structure can adopt any one of stripping structures such as herringbone baffle, annular baffle, conical baffle, grid baffle, bulk packing and structured packing, or a combination of more thereof.

The particle size refining section can include a jet grinder, which is configured to utilize the steam entered from a grinding steam inlet to crush and sieve the coke powder particles treated in the steam stripping section, so as to ensure that the coke powder particles entering the gasification section can have a larger contact area with the gasification agent, thereby ensuring the efficient progress of the gasification reaction.

Coke powder particles with a large particle size in the cracking section are sequentially subjected to the steam stripping treatment and the particle size refining treatment in the descending process, then finally enter into the gasification section, and mix with the coke powder particles for the second stage circulation, and undergo a gasification reaction with the gasification agent fed into the gasification section, thereby producing the synthesis gas.

Furthermore, due to the further configuration of the steam stripping section and the particle size refining section between the cracking section and the gasification section, it is ensured that the cracking section and the gasification section have relatively independent reaction environments, further avoiding adhesion and agglomeration of the coke powder particles between the cracking section and the gasification section, and ensuring the safety and operational stability of the cracking-gasification coupling reaction.

The present disclosure can include, but is not limited to, the following two gas-solid separation ways for the light oil gas and the synthesis gas entering the gas-solid separation system.

In an embodiment, in the gas-solid separation system, the light oil gas and the synthesis gas are subjected to the first stage gas-solid separation and the second stage gas-solid separation in sequence, so as to sequentially separate first stage coke powder particles and second stage coke powder particles, and collect a purified oil and gas product; the first stage coke powder particles are returned to the cracking section to form the first stage circulation, and the second stage coke powder particles are returned to the gasification section to form the second stage circulation; where the particle size of the first stage coke powder particles is greater than that of the second stage coke powder particles.

Specifically, the gas-solid separation system can include a first gas-solid separation device and a second gas-solid separation device in series, where the first gas-solid separation device is configured to receive a to-be-separated material stream (light oil gas, synthesis gas, and coke powder particles mingled therein) which enters into the gas-solid separation system, and after the first gas-solid separation device performs the first stage gas-solid separation on the to-be-separated material stream, a non-solid material stream is output to the second gas-solid separation device for performing the second stage gas-solid separation.

After the light oil gas and the synthesis gas according to the present disclosure enter into the gas-solid separation system, the first stage gas-solid separation is first performed in the first gas-solid separation device, to obtain a first stage non-solid material stream (separated light oil gas and synthesis gas) and first stage coke powder particles, the first stage coke powder particles can return to the cracking section through a pipeline to form the first stage circulation; the first stage non-solid material stream will enter into the second gas-solid separation device and be subjected to the second stage gas-solid separation, to obtain a second stage non-solid material stream (purified oil and gas product, which will be subjected to fractionation to obtain a light oil product and a synthesis gas product) and the second stage coke powder particles, the second stage coke powder particles can return to the gasification section through a pipeline to form the second stage circulation.

Where separation parameters of the first gas-solid separation device and the second gas-solid separation device can be defined, so that the particle size of the first stage coke powder particles is greater than that of the second stage coke powder particles. Exemplarily, the particle size of the first stage coke powder particles is greater than 20 µm, and further, the particle size of the first stage coke powder particles is preferably greater than 50 µm; the particle size of the second stage coke powder particles is less than 50 µm, and further, the particle size of the second stage coke powder particles is preferably less than 20 µm.

The present disclosure performs the classification treatment on the coke powder particles entering into the gas-solid separation system through the setting of the first stage gas-solid separation and the second stage gas-solid separation, as far as possible to ensure that the coke powder particles participating in the gasification reaction have a relatively small particle size, so that the conversion rate of the coke powder particles in the gasification reaction can be improved, to improve the gas generation amount and quality of the synthesis gas; then, after the synthesis gas ascend into the cracking section, it can not only ensure that a large amount of heat is transferred to the cracking section, but also enable the cracking reaction to proceed in a hydrogen-enriched environment, so as to improve the quality of the light oil gas.

The aforementioned first gas-solid separation device can be one or more cyclone separators in series or in parallel, and the second gas-solid separation device can be one or more cyclone separators in series or in parallel.

In another embodiment, the light oil gas and the synthesis gas are subjected to the first stage gas-solid separation in the gas-solid separation system, and the coke powder particles are collected and pass through a coke powder return distribution mechanism, then they are sent back to the cracking section and the gasification section respectively by means of fluidizing gas back blowing, so as to form the first stage circulation and the second stage circulation. And the collected non-solid material stream, which serves as the purified oil and gas product, enters into a subsequent fractionation treatment, to obtain a light oil product and a synthesis gas product.

Where one or more cyclone separators in series or in parallel can be used to perform the first stage gas-solid separation, and the collected coke powder particles are first gathered in the coke powder return distribution mechanism, then they enter into the cracking section and the gasification section respectively by means of fluidizing gas back blowing, to form the first stage circulation and the second stage circulation.

The aforementioned fluidizing gas may include steam and/or nitrogen, etc., and may also be the synthesis gas generated in the gasification section of the present disclosure. If the synthesis gas according to the present disclosure is used as the fluidizing gas, the synthesis gas output from the gas-solid separation system can be collected, and part of the synthesis gas is use as the fluidizing gas. With the implementation of the first stage circulation and the second stage circulation, the synthesis gas will eventually enter into the coupled reactor to be collected, which both reduces the cost of heavy oil cracking and improves the use efficiency of the synthesis gas, reducing the energy consumption.

Furthermore, the ratio of the coke powder particles for the first stage circulation and the second stage circulation respectively can be controlled by controlling the back blowing speed of the fluidizing gas, so that efficiencies of reactions in the cracking section and the gasification section can be controlled. In the present disclosure, in order to ensure the positive effect of synthesis gas generated in the gasification section on the cracking reaction, the back blowing speed of the fluidizing gas can be 0.2-3.0 m/s.

The present disclosure also defines the process parameters in the coupled reactor below, so as to further achieve the matching of material stream and energy stream during heavy oil processing, and ensure the stability throughout the heavy oil processing, improving overall energy efficiency.

Within the cracking section, the reaction temperature of the cracking reaction is 450-700° C., the reaction pressure is 0.1-6.0 MPa, the reaction time is 1-20 s, the superficial gas velocity is 1-20 m/s, and the catalyst-oil ratio is 4-20. In general, the heavy oil is preheated to 150-350° C. and then enters the cracking section for reaction. Where the superficial gas velocity refers to a superficial velocity of a collection of the fluidizing gas for fluidizing the coke powder particles and the synthesis gas entered by ascending.

Within the gasification section, the reaction temperature of the gasification reaction is 850-1200° C., the reaction pressure is 0.1-6.0 MPa, the superficial gas velocity is 0.1-5.0 m/s, the residence time of the coke powder particles is 1-20 min. Where the superficial gas velocity refers to a superficial velocity of a collection of the gasification agent and the fluidizing gas for fluidizing the coke powder particles, the residence time of the coke powder particles refers to time when the coke powder particles stay in the gasification section.

The above reaction conditions can ensure a smooth progress of the gasification reaction, and facilitate a reasonable distribution of the coke powder particles in the cracking section (a small part of fine powder particles enter the gas-solid separation system, most of the coke powder particles remain in the cracking section and continue to serve as carriers in the cracking reaction, and a small part of the coke powder particles with a large particle size descend into the gasification section to participate in the gasification reaction), so as to ensure the stability of the entire process.

The gasification agent according to the present disclosure can be fed into the gasification section from the outside of the coupled reactor, and specifically, the gasification agent may be selected from one or more of oxygen, steam, oxygen-enriched air and air.

Further, in the steam stripping treatment, the mass ratio of the steam to the heavy oil is 0.1-0.3, the temperature of steam is 200-400° C., the superficial gas velocity of the steam is 0.5-5.0 m/s. The treatment conditions can not only remove the oil gas on the surface of the coke powder particles, which descend into the gasification section from the cracking section, but also become, together with the ascended synthesis gas, a driving force for a to-be-separated material stream entering into the gas-solid separation system.

Additionally, a washing section can also be added at the upper part of the cracking section of the coupled reactor, so that the to-be-separated material stream of the coupled reactor is subjected to the washing treatment and then enters into the gas-solid separation system. Specifically, before the to-be-separated material stream enters into the gas-solid separation system, the to-be-separated material stream can first pass through the washing section containing a low-temperature liquid for washing and cooling, which can remove, on one hand, some of the coke powder particles in the to-be-separated material stream, and make the removed coke powder particles fall back to the cracking section to continue to serve as carriers for cracking, and on the other hand, can cool down the to-be-separated material stream, to avoid the to-be-separated material stream to continue to generate the coke in the gas-solid separation system at a high temperature, thereby further improving the quality of light oil gas and also avoiding the block of the gas-solid separation system caused by excessive coke generation.

The washing section for cooling can adopt a built-in packing structure to enhance the contact between a mixture stream and a low-temperature liquid, or it can adopt a column tray structure to enhance the contact between the mixture stream and the low-temperature liquid.

The built-in packing structure may include one of bulk packings, such as, raschig ring, pall ring, cascade ring, berl saddle, intalox saddle, metal ring intalox saddle and spherical packing, or structured packings, such as grid packing, ripple packing and pulse packings, or a combination of more thereof.

The column tray structure may include one of bubble cap tray, sieve tray, float valve tray, jet tray and dual-flow tray, or a combination of more thereof.

The aforementioned low-temperature liquid can be the heavy oil material. In an actual operation, the heavy oil material is divided into two streams entering into the cracking section, one stream of the heavy oil material directly contacts with the coke powders to implement the cracking reaction, the other stream of the heavy oil material, which serves as the low-temperature liquid, firstly passes the washing section for heat exchange, then descends and is subjected to the cracking reaction with the coke powders, so as to reduce the energy consumption required for the cracking reaction effectively. In the present disclosure, the heavy oil material, which serves as the low-temperature liquid, accounts for 5-10% of the total mass of the heavy oil material.

Further, in order to improve the utilization ratio of the coke powder particles, the coke powder particles obtained by the gas-solid separation can pass through a dispersing device and then enter into the cracking section and the gasification section respectively, so that the coke powder particles can be evenly distributed in the cracking section and the gasification section, making more coke powder particles participate in the reaction, thereby improving reaction efficiencies of the cracking reaction and the gasification reaction.

Conradson's carbon residue value of the heavy oil material according to the present disclosure is ≥8%, and specifically, the heavy oil material can be any one of viscous oil, super viscous oil, oil sand asphalt, atmospheric pressure heavy oil, vacuum residue, catalytic cracking slurry and solvent deoiled asphalt, or a mixture more thereof in any ratio; the heavy oil material can also be one of derived heavy oils, such as heavy tar and residue in pyrolysis or liquefaction of a coal, heavy oil produced by oil shale retorting, liquid product of low-temperature pyrolysis in biomass, or a mixture of more thereof in any ratio.

The coke powders according to the present disclosure can choose the coke powder particles that have a micro-spherical structure and have an excellent fluidization property. Generally, the particle size of the coke powders is 10-500 μm, and preferably 20-200 μm.

The present disclosure will be described in detail below in conjunction with specific examples and accompanying drawings.

Example 1

FIG. 1 is a schematic diagram of a device of heavy oil lightening and synthesis gas production provided by an embodiment of the present disclosure, and a method for heavy oil lightening and synthesis gas production provided by the present example uses the device as shown in FIG. 1, where the device at least includes:

a cracking/gasification coupled reactor 100, which includes a cracking section 1 and a gasification section 2 that communicate with each other internally; and a raw material inlet, an oil gas outlet, a first stage particle inlet and a second stage particle inlet, where the cracking section 1 is located above the gasification section 2, the first stage particle inlet and the raw material inlet are located in the cracking section 1, the second stage particle inlet is located in the gasification section 2, the oil gas outlet is located at the top of the cracking/gasification coupled reactor 100.

Specifically, the cracking/gasification coupled reactor can be obtained by appropriate modification and assembly of a cracking reactor and a gasification reactor commonly used in the art, and the pyrolysis reactor, for example, may be a fluidized bed reactor, the bottom of which communicates with the top of the gasification reactor. The cracking reactor and the gasification reactor are preferably arranged coaxially, so as to facilitate the transportation and circulation of materials;

where the cracking section 1 can include a fluidized bed therein, so that the coke powder particles are in fluidized state through the effect of the fluidized bed, and serve as carriers for the cracking reaction;

the gasification section 2 can include a fluidized bed therein, so that the coke powder particles are in fluidized state through the effect of the fluidized bed, and contact with a gasification agent a to implement the gasification reaction, the gasification section is further provided with a gasification agent inlet for injecting the gasification agent a and a slag discharge outlet for outputting a solid slag b and other impurities that cannot be converted by reaction.

The device further includes a gas-solid separation system 3, including a gas-solid separation inlet, a gas-solid separation oil gas outlet and a gas-solid separation solid outlet; and a fractionating tower 4, including a fractionating tower inlet and a plurality of light component outlets;

the gas-solid separation system 3 is located outside the cracking/gasification coupled reactor 100, the oil gas outlet communicates with the gas-solid separation inlet, the first stage particle inlet and the second stage particle inlet communicate with the gas-solid separation solid outlet, and the gas-solid separation oil gas outlet communicates with the fractionating tower inlet.

On the basis of the above, the interior of the cracking/gasification coupled reactor 100 in FIG. 1 further includes:

a steam stripping section 5, which may include a steam stripping baffle, so as to remove the oil gas on the surface of the coke powder particles by injection of steam during the descending process;

a particle size refining section 6, which may include a steam jet grinder, through which the steam is injected to refine and grind the stripped coke powder particles;

an atomization device 7, which is provided in the cracking section 1, communicates with the raw material inlet, and is used for atomizing the heavy oil material c;

a first dispersing device 8, which is provided in the cracking section 1, communicates with the first stage particle inlet, and is used for dispersing the coke powder particles d for the first stage circulation;

a second dispersing device 9, which is provided in the gasification section 2, communicates with the second stage particle inlet, and is used for dispersing the coke powder particles e for the second stage circulation;

a washing section 10, which is provided at the upper part of the cracking section 1, communicates with the cracking section 1, and is used for washing and cooling a to-be-separated material stream f that is about to enter into the gas-solid separation system 3;

where the cracking section 1 includes two raw material inlets, where one raw material inlet leads to the fluidized coke powders directly, and the other raw material inlet leads to the washing section 10.

The exterior of the cracking/gasification coupled reactor 100 in FIG. 1 further includes:

a coke powder return distribution mechanism 11, which is provided between the gas-solid separation system 3 and cracking/gasification coupled reactor 100; through which the gas-solid separation solid outlet communicates with the first stage particle inlet and the second stage particle inlet respectively; and which includes a coke powder return inlet and a coke powder return outlet, where the coke powder return inlet communicates with the gas-solid separation solid outlet, the coke powder return outlet communicates with the first stage particle inlet and the second stage particle inlet respectively.

A method for heavy oil lightening and synthesis gas production by the device provided by the present example is briefly described as follows:

A heavy oil material c is fed into the cracking/gasification coupled reactor 100 through a first raw material inlet and a second raw material inlet, respectively; the heavy oil material c, which is fed into the cracking section 1 through the first raw material inlet, is subjected to an atomization treatment by the atomization device 7, then directly contacts with the fluidized coke powders (including coke powder particles, the outside of which is attached with cokes) to implement the cracking reaction; the heavy oil material c, which is fed through the second raw material inlet, firstly passes through the washing section 10 to exchange heat with the to-be-separated material stream f that is about to enter into the gas-solid separation system 3, and then descends into the cracking section 1 to contact with the fluidized coke powders to implement the cracking reaction.

The heavy oil material c undergoes the cracking reaction through the above two paths, to obtain a light oil gas and a coke respectively, the coke will adhere to the surface of the coke powders to form the coke powder particles. A part of the coke powder particles with serious coking and large particle size will descend under the action of gravity, and in the descending process, they firstly pass through the steam stripping section 5 to remove the light oil gas remaining on the surface of the coke powder particles, and then they pass through the particle size refining section 6 to cut and refine the particle size of the coke powder particles. Finally, the coke powder particles descend into the gasification section 2 from the particle size refining section 6.

In the gasification section 2, the aforementioned refined coke powder particles implement the gasification reaction with the gasification agent that enters into the gasification section 2 through the gasification agent inlet, and then a synthesis gas g is obtained. Moreover, during the gasification of the coke powder particles, the unreacted solid slag b can be discharged out of the cracking/gasification coupled reactor 100 through the slag discharge outlet after accumulation, and heavy metals in the solid slag b can be recycled through subsequent processes.

The synthesis gas g will ascend (it will carry some un-gasified coke powder particles with small particle size during the ascending process) into the cracking section 1 under the drive of the gasification agent a, to provide the reaction heat and the reaction atmosphere (the amount of the synthesis gas that is ascending can be controlled by adjusting the type of the gasification agent, the gas velocity and so on, so as to ensure that the material stream matches with the energy stream within the cracking/gasification coupled reactor 100) for the cracking reaction of the heavy oil, and the synthesis gas g will be combine with the light oil gas, and they are led out of the cracking/gasification coupled reactor 100 through the oil gas outlet, and enter into a gas-solid separation system 3 through the gas-solid separation inlet.

The gas-solid separation in the present example is the first stage gas-solid separation (that is, only one gas-solid separation is performed), the separated coke powder particles are output through the gas-solid separation solid outlet, and enter into the coke powder return distribution mechanism 11 through the coke powder return inlet, and are divided into two paths from the coke powder return outlet of the coke powder return distribution mechanism 11 under the back blowing of a fluidizing gas h, entering into the cracking section 1 and the gasification section 2 respectively; where the coke powder particles that enter into the cracking section 1 through the first stage particle inlet are the coke powder particles d for the first stage circulation, the coke powder particles that enter into the gasification section 2 through the second stage particle inlet are the coke powder particles e for the second stage circulation.

As it can be appreciated, the coke powder particles d for the first stage circulation are mixed with the coke powder particles in the cracking section 1, they will continue to circulate (a part of them descends into the gasification section 2 and serves as a raw material of the gasification agent, a part of them stays in cracking section 1 and serves as a carrier for the cracking reaction, and a part of them is mixed with the light oil gas and the synthesis gas and enters into the gas-solid separation system 3); the coke powder particles e for the second stage circulation will be subjected to the gasification reaction in the gasification section 2, and some coke powder particles that have not undergone the gasification reaction will be carried by the synthesis gas g and ascend into the cracking section 1.

Purified oil and gas product i output from the gas-solid separation oil gas outlet will enter into a fractionating tower 4 through a fractionating tower inlet to perform fractionation, so that light oil, cracked gas (dry gas, liquefied gas, etc.) and synthesis gas products will be separately output from a plurality of light component outlets of the fractionating tower 4. Of course, a plurality of fractionating towers can also be provided for further cutting and fractionation, so as to obtain liquid products of components with different distillation range, where the heavy oil at the bottom of the tower (including part of the coke powder particles, etc.) can be mixed with the heavy oil material c, and recycled into the cracking/gasification coupled reactor 100 for processing.

Conditions of the above cracking reaction include: reaction temperature is 450-700° C., reaction pressure is 0.1-6.0 MPa, reaction time is 1-20 s, superficial gas velocity is 1-20 m/s, and catalyst-oil ratio is 4-20.

Conditions of the above gasification reaction include: reaction temperature is 850-1200° C., reaction pressure is 0.1-6.0 MPa, superficial gas velocity is 0.1-5.0 m/s, and residence time of the coke powder particles is 1-20 min.

Conditions of the above steam stripping treatment include: mass ratio of the steam to the heavy oil is 0.1-0.3, temperature of steam is 200-400° C., and superficial gas velocity of the steam for stripping is 0.5-5.0 m/s.

In the coke powder return distribution mechanism, the back blowing speed of the fluidizing gas is 0.2-3.0 m/s.

In order to verify the effect of the present disclosure, the device and process flow shown in FIG. 1 are used to test two kinds of heavy oils (Liaohe atmospheric pressure heavy oil and Liaohe vacuum heavy oil), respectively.

Table 1 shows the properties of the heavy oil materials, and Table 2 shows specific reaction parameters. Compared with conventional cracking processes of heavy oil, the method in the present example can increase the yield of the light oil, and increase the yield of the liquid, yields of the dry gas and the coke are significantly reduced. The detailed product distribution can be seen in Table 3 and Table 4.

TABLE 1

| Sample Name | Liaohe Atmospheric Pressure Heavy Oil | Liaohe Vacuum Heavy Oil |
| --- | --- | --- |
| Density (20° C.)/g · cm$^{-3}$ | 0.9817 | 1.0271 |
| Kinematic Viscosity (100° C.)/mm$^2$ · s$^{-1}$ | 314.8 | 3380 |
| Conradson's Carbon Residue/wt % | 13.39 | 20.04 |
| C/wt % | 86.8 | 86.05 |
| H/wt % | 11.58 | 10.09 |
| S/wt % | 0.39 | 0.48 |
| N/wt % | 0.81 | 1.55 |
| n(H)/n(C) | 1.59 | 1.41 |
| Saturated Fraction/wt % | 31.08 | 16.36 |
| Aromatic Fraction/wt % | 26.13 | 36.91 |
| Colloid/wt % | 40.06 | 41.12 |
| Asphaltene/wt % | 2.73 | 5.61 |
| Ni/ppm | 88 | 175 |
| V/ppm | 2.16 | 3.6 |
| Initial Boiling Point | 360 | 412 |
| 10% | 399 | 456 |
| 30% | 446 | 498 |
| 50% | 482 | 547 |
| 70% | 542 | 611 |
| 90% | 628 | 672 |
| Final Boiling Point | 692 | 775 |
| VGO Ratio (350-500° C.) | 56.62% | 30.98% |
| Heavy Oil Fraction Ratio (>500° C.) | 43.38% | 69.02% |

TABLE 2

|  | Ash | Fixed Carbon | Volatile Component | Particle Size |
| --- | --- | --- | --- | --- |
| Coke Powder (wt %, dry) | 0.63 | 91.42 | 7.95 | 20-100 μm |

|  | Temperature | Reaction Time | Catalyst-Oil Ratio | Pressure | Superficial Gas Velocity |
| --- | --- | --- | --- | --- | --- |
| Cracking reaction | 505° C. | 16 s | 7.5 | 0.1 Mpa | 3.0 m/s |

|  | Temperature | Reaction Time | Gasification Agent | Pressure | Superficial Gas Velocity |
| --- | --- | --- | --- | --- | --- |
| Gasification Reaction | 850° C. | 600 s | Steam and Oxygen | 0.1 Mpa | 0.30 m/s |

|  | Temperature | Superficial Gas Velocity of Steam | Steam/Oil Ratio |
| --- | --- | --- | --- |
| Stripping Treatment | 350° C. | 1.0 m/s | 0.15 |

TABLE 3

| Sample Name/wt % | Liaohe Atmospheric Pressure Heavy Oil | Liaohe Vacuum Heavy Oil |
| --- | --- | --- |
| Yield of Dry Gas | 3.97 | 4.13 |
| Yield of Liquefied Gas | 1.01 | 1.07 |
| Gasoline Fraction | 2.14 | 2.01 |
| Diesel Fraction | 6.84 | 6.43 |
| Vacuum Gas Oil | 40.77 | 38.33 |
| Heavy Oil Fraction | 33.18 | 31.19 |
| Yield of Coke | 12.09 | 16.84 |

Table 3 shows that:

1. the method and device in the present example can significantly increase the yield of the light oil and inhibit the production of the coke;

2. as the heavy oil material becomes worse in quality, yields of the gas and the coke obtained from cracking increase gradually, and the yield of the liquid decreases gradually. Compared with the initial carbon residue value of the raw material, the ratio of coke yield to carbon residue is about 0.8-0.9, which is much smaller than the ratio, which is 1.4-1.6, of coke/carbon residue in a delayed coking. With the changes of properties of the heavy oil material, the mass yield of the liquid is maintained between 70-80%, including some heavy oil fractions greater than 500° C., which can be processed later by recycling to refine.

TABLE 4

| Synthesis Component | Gas | $H_2$ | CO | $CO_2$ | $CH_4$ and Other Component |
| --- | --- | --- | --- | --- | --- |
| Volume (vol %) | Content | 46.6 | 34.9 | 16.1 | 2.4 |

As shown in Table 4, in the synthesis gas obtained in the present example, the sum of volume fractions of $H_2$ and CO is about 80%, and as a high-quality synthesis gas, it can be used in the subsequent reforming for hydrogen production or F-T synthesis of oil and other processes, and can significantly reduce cracking and coke formation of the heavy oil material.

Example 2

Figure 2:
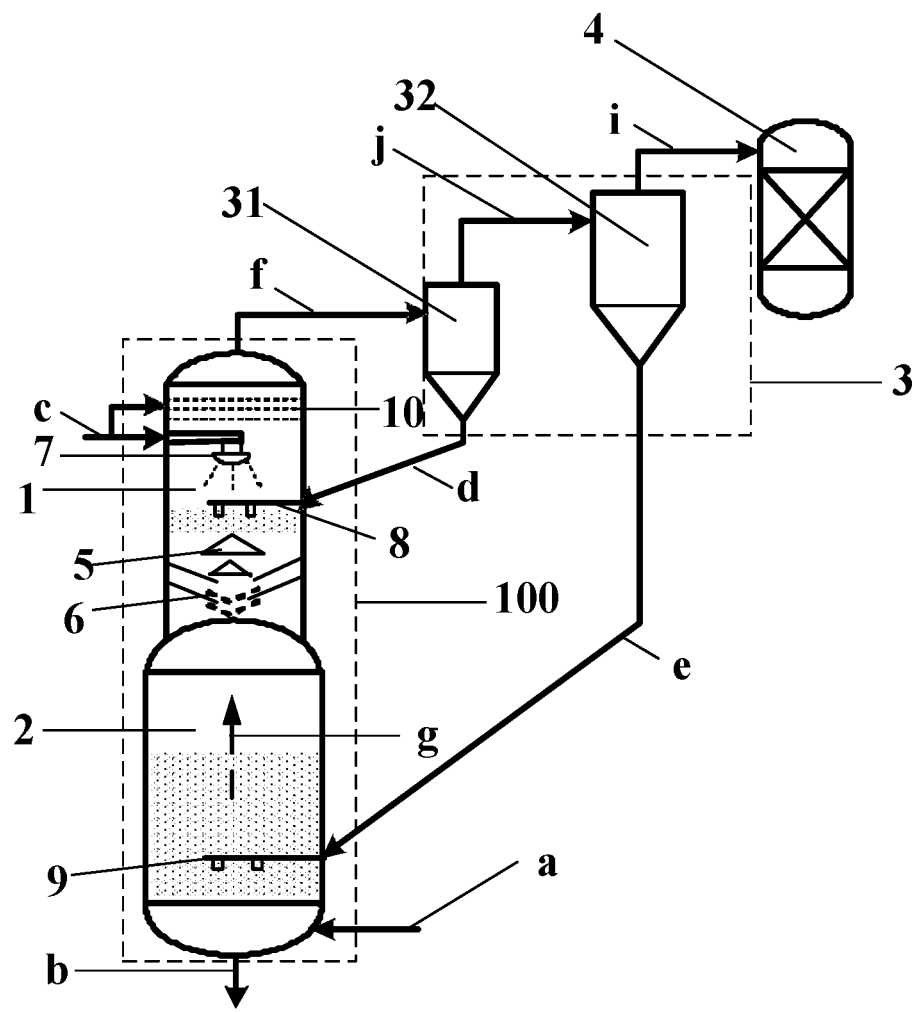
FIG. 2 is a schematic diagram of a device of heavy oil lightening and synthesis gas production provided by another embodiment of the present disclosure.

FIG. 2 is a schematic diagram of a device of heavy oil lightening and synthesis gas production provided by another embodiment of the present disclosure. A method for heavy oil lightening and synthesis gas production provided by the present example uses the device as shown in FIG. 2. The differences from the device in Example 1 lie in: in the device of the present example, the gas-solid separation system 3 includes a first gas-solid separation device 31 and a second gas-solid separation device 32; a solid outlet of the first gas-solid separation device 31 communicates with the first stage particle inlet, an oil gas outlet of the first gas-solid separation device 31 communicates with an inlet of the second gas-solid separation device 32, a solid outlet of the second gas-solid separation device 32 communicates with the second stage particle inlet, and an oil gas outlet of the second gas-solid separation device 32 communicates with the fractionating tower inlet.

The first gas-solid separation device 31 and the second gas-solid separation device 32 can be cyclone separators.

Compared to the method in Example 1, the differences of the method for heavy oil lightening and synthesis gas production using the device provided by the present example lie in: the to-be-separated material stream f after treated in the washing section 10 firstly enters into the first gas-solid separation device 31 for performing the first stage gas-solid separation, to obtain a first stage non-solid material stream j (separated light oil gas and synthesis gas) and first stage coke powder particles, the first stage coke powder particles can return to the cracking section through a pipeline to form coke powder particles d for the first stage circulation; the first stage non-solid material stream j will enter into the second gas-solid separation device 32 to be subjected to the second stage gas-solid separation, to obtain a second stage non-solid material stream (purified oil and gas product i, which is about to be fractionated to obtain light oil and synthesis gas products) and second stage coke powder particles, the second stage coke powder particles can return to the gasification section 2 through a pipeline to form coke powder particles e for the second stage circulation.

In order to verify the effect of the present disclosure, the device and process flow shown in FIG. 2 are used to test two kinds of heavy oils (Liaohe atmospheric pressure heavy oil and Liaohe vacuum heavy oil) in Example 1, respectively. Specific reaction parameters are the same as in Example 1. Compared with conventional cracking processes of heavy oil, use of the method in the present example can enable mass yield of the liquid to be maintained between 70-80%, and the sum of volume fractions of H2 and CO in the obtained synthesis gas is about 80%.

Finally, it should be noted that the above examples are only used to illustrate the technical solutions of the present disclosure, without limitation to the present disclosure. Although the present disclosure has been described in detail with reference to the foregoing examples, those skilled in the art should understand that: modifications to the technical solutions described in the foregoing examples, or equivalent substitutions of some or all of the technical features therein can still be made by them; these modifications or substitutions do not make the essence of the corresponding technical solutions deviate from the scope of the technical solutions of the examples of the present disclosure.

What is claimed is:

1. A method for heavy oil lightening and synthesis gas production, using a cracking/gasification coupled reactor, which internally has a cracking section and a gasification section that communicate with each other, as a reactor, and comprising the following steps:

feeding a heavy oil material into the cracking section at an upper part of the cracking/gasification coupled reactor, so as to contact with fluidized coke powders to implement a cracking reaction, to produce a light oil gas and a coke; sequentially performing a steam stripping treatment and a particle size refining treatment on the coke powders, the coke being carried by the coke powders and descending into the gasification section at a lower part of the cracking/gasification coupled reactor to implement a gasification reaction, to produce a synthesis gas; wherein the synthesis gas ascends into the cracking section, then is combined with the light oil gas, and is led out of the cracking/gasification coupled reactor to enter a gas-solid separation system;

at least performing a first stage gas-solid separation on the light oil gas and the synthesis gas in the gas-solid separation system, collecting coke powder particles and dividing them into two parts, which return to the cracking section and the gasification section respectively, to form a first stage circulation and a second stage circulation of the coke powder particles;

performing an oil and gas fractionation on a purified oil and gas product output by the gas-solid separation system, and collecting a light oil product and a synthesis gas product.

2. The method according to claim 1, further comprising:
sequentially performing the first stage gas-solid separation and a second stage gas-solid separation on the light oil gas and the synthesis gas in the gas-solid separation system, so as to sequentially separate first stage coke powder particles and second stage coke powder particles, and collect a purified oil and gas product; returning the first stage coke powder particles to the cracking section to form the first stage circulation, and returning the second stage coke powder particles to the gasification section to form the second stage circulation; wherein a particle size of the first stage coke powder particles is greater than a particle size of the second stage coke powder particles;

or, performing the first stage gas-solid separation on the light oil gas and the synthesis gas in the gas-solid separation system, and collecting the coke powder particles and passing them through a coke powder return distribution mechanism, then sending them back to the cracking section and the gasification section respectively by means of back blowing of a fluidizing gas, so as to form the first stage circulation and the second stage circulation.

3. The method according to claim 2, wherein the particle size of the first stage coke powder particles is greater than 20 μm, and the particle size of the second stage coke powder particles is less than 50 μm.

4. The method according to claim 2, wherein a back blowing speed of the fluidizing gas is 0.2-3.0 m/s.

5. The method according to claim 1, wherein conditions of the cracking reaction are: reaction temperature is 450-700° C., reaction pressure is 0.1-6.0 Mpa, reaction time is 1-20 s, and superficial gas velocity is 1-20 m/s.

6. The method according to claim 1, wherein conditions of the gasification reaction are: reaction temperature is 850-1200° C., reaction pressure is 0.1-6.0 Mpa, superficial gas velocity is 0.1-5.0 m/s, and residence time of the coke powder particles is 1-20 min.

7. The method according to claim 1, wherein conditions of the steam stripping treatment are: a mass ratio of steam to the heavy oil material is 0.1-0.3, temperature of the steam is 200-400° C., and superficial gas velocity of the steam is 0.5-5.0 m/s.

8. A method for heavy oil lightening and synthesis gas production, using a cracking/gasification coupled reactor, which internally has a cracking section and a gasification section that communicate with each other, as a reactor, and comprising the following steps:

feeding a heavy oil material into the cracking section at an upper part of the cracking/gasification coupled reactor, so as to contact with fluidized coke powders to implement a cracking reaction, to produce a light oil gas and a coke; the coke being carried by the coke powders and descending into the gasification section at a lower part of the cracking/gasification coupled reactor to implement a gasification reaction, to produce a synthesis gas; wherein the synthesis gas ascends into the cracking section, then is combined with the light oil gas, and is led out of the cracking/gasification coupled reactor to enter a gas-solid separation system;

at least performing a first stage gas-solid separation on the light oil gas and the synthesis gas in the gas-solid separation system, collecting coke powder particles and dividing them into two parts, which return to the cracking section and the gasification section respectively, to form a first stage circulation and a second stage circulation of the coke powder particles;

performing an oil and gas fractionation on a purified oil and gas product output by the gas-solid separation system, and collecting a light oil product and a synthesis gas product;

the method further comprising:

sequentially performing the first stage gas-solid separation and a second stage gas-solid separation on the light oil gas and the synthesis gas in the gas-solid separation system, so as to sequentially separate first stage coke powder particles and second stage coke powder particles, and collect a purified oil and gas product; returning the first stage coke powder particles to the cracking section to form the first stage circulation, and returning the second stage coke powder particles to the gasification section to form the second stage circulation; wherein a particle size of the first stage coke powder particles is greater than a particle size of the second stage coke powder particles;

or, performing the first stage gas-solid separation on the light oil gas and the synthesis gas in the gas-solid separation system, and collecting the coke powder particles and passing them through a coke powder return distribution mechanism, then sending them back to the cracking section and the gasification section respectively by means of back blowing of a fluidizing gas, so as to form the first stage circulation and the second stage circulation.

* * * * *